United States Patent [19]

Lipman et al.

[11] Patent Number: 4,954,726
[45] Date of Patent: Sep. 4, 1990

[54] SWITCHING AN INVERTER WITH STORED SIGNAL SEQUENCES

[75] Inventors: Kenneth Lipman; Douglas G. Young, both of West Hartford, Conn.

[73] Assignee: International Fuel Cells Corporation, South Windsor, Conn.

[21] Appl. No.: 456,043

[22] Filed: Dec. 22, 1989

Related U.S. Application Data

[63] Continuation of Ser. No. 890,664, Jul. 30, 1986, abandoned.

[51] Int. Cl.$^5$ .............................................. H02J 3/18
[52] U.S. Cl. ...................................... 307/46; 323/207; 363/41
[58] Field of Search ............... 363/41, 42, 79; 307/46, 307/66; 323/207

[56] References Cited

U.S. PATENT DOCUMENTS

| | | | |
|---|---|---|---|
| 3,893,015 | 7/1975 | Weil . | |
| 4,060,757 | 11/1977 | McMurray | 363/57 |
| 4,099,109 | 7/1978 | Abbondanti | 363/42 |
| 4,180,853 | 12/1979 | Scorso, Jr. et al. | 363/96 |
| 4,204,264 | 5/1980 | Lipman | 363/71 |
| 4,245,290 | 1/1981 | Lipman | 363/41 |
| 4,251,735 | 2/1981 | Coleman | 307/46 |
| 4,251,736 | 2/1981 | Coleman | 307/46 |
| 4,266,190 | 5/1981 | Lipman | 324/117 R |
| 4,290,108 | 9/1981 | Woehrle et al. | 363/41 |
| 4,330,717 | 5/1982 | Coleman | 307/46 |
| 4,358,820 | 11/1982 | Lipman | 363/135 |
| 4,361,791 | 11/1982 | Plunkett | 318/723 |
| 4,419,619 | 12/1983 | Jindrick et al. | 323/257 |
| 4,447,786 | 5/1984 | Saar et al. | 363/41 |
| 4,562,524 | 12/1985 | Mutoh et al. | 363/41 |
| 4,564,895 | 1/1986 | Glennon | 363/41 |
| 4,595,976 | 6/1986 | Parro | 363/41 |
| 4,636,928 | 1/1987 | Deguchi et al. | 363/41 |

FOREIGN PATENT DOCUMENTS

46869  3/1983  Japan .................................... 363/41

OTHER PUBLICATIONS

Sone et al., "Microprocessor-Based Universal Thyristor Switch and Its Application to a PWM Inverter for Traction", IEEE Trans. on Ind. Elect. & Control Inst., vol. IECI-28, No. 2, pp. 162-167, May 1981.

Primary Examiner—William H. Beha, Jr.
Attorney, Agent, or Firm—Francis J. Maguire, Jr.

[57] ABSTRACT

A method and apparatus is disclosed for generating thyristor gating signals for a force commutated inverter in order to produce variable frequency pulse-width modulated output waveforms with the appropriate percent fundamental voltage content for reactive power control and with the correct phase relationship to the utility line for real power control. A signal processor in conjunction with a memory is used to store individual patterns for generating a wide variety of PWM waveforms at different frequencies over the entire modulation range so as to provide the designer with the flexibility to select the most advantageous harmonic cancellation for each operating point. An embodiment of the invention disclosed uses three microprocessors to generate the PWM waveforms and a fourth microprocessor to synhcronize the other three and produce the required phase shift. The principles disclosed apply to inverters used and controlled in parallel with a grid of real and reactive control signal commands and also those used independently by means of voltage magnitude commands.

2 Claims, 10 Drawing Sheets

PRIOR ART

*FIG. 3*

PRIOR ART

*FIG. 4A*

PRIOR ART

SWITCHING AN INVERTER WITH STORED SIGNAL SEQUENCES

This is a continuation of application Ser. No. 06/890,664, filed July 30, 1986, now abandoned.

Technical Field

This invention relates to force commutated inverters and more particularly to a method for generating gating signals for the switches in the output stage of such an inverter in order to produce a variable frequency pulse-width modulated (PWM) output waveform with the appropriate percent fundamental voltage. In the case of an inverter connected to a utility line the correct phase relationship to the line is maintained.

Background Art

Control of an independent inverter's output voltage is required or, in the case of an inverter operating in parallel with a grid, control of the output phase and voltage is required to achieve, respectively, a desired real and reactive power operating point. Such an inverter controller may be thought of, in simplified form, as being responsive to a voltage command or to separate, externally supplied real and reactive power command signal levels which may, of course, change depending on operating conditions.

Such a control (for the case of an inverter operating on a grid) is described in U.S. Pat. No. 4,251,735 entitled DUAL SPEED CONTROL CIRCUIT FOR POWER FLOW THROUGH AN INVERTER, issued to Allen K. Coleman on Feb. 17, 1981 and assigned to the assignee of this patent. There, a control circuit varies the real power component and the reactive power component of the electrical energy flowing between a DC source and a utility power grid. Independent control of the magnitude of both the real and reactive components is disclosed in both U.S. Pat. No. 4,251,735 and in another patent, U.S. Pat. No. 4,251,736, issued to the same inventor on the same date and also assigned to the assignee of this patent. Thus, it is now known that real and reactive power components may be varied substantially independently using separate reactive and real power command signals input to a controller.

In addition, U.S. Pat. No. 4,251,735 discloses a look-up table for storing pulse width modulated waveform patterns for use in a switching waveform generator. The switching waveform generator responds to a voltage controller to select one of the stored switching waveform patterns for switching the inverter output stage main switching elements, normally thyristors or other solid-state switches, such that the output voltage waveform has a certain effective fundamental voltage. This controls the reactive power component. Also, the particular pattern is phase offset in proportion to the signal presented to the switching waveform generator from a phase controller to the switching waveform generator in order to control the real power component. Coleman discloses one embodiment of a switching waveform generator which includes a look-up table responsive to an eight line digital data bus from the voltage controller. The look-up table stores, in digital format, the predetermined width of various notches in the switching pattern waveform at which the thyristors of each bridge in the output stage of the inverter should be transitioned to create a voltage output waveform having the particular desired effective voltage magnitude. As recorded information is addressed by the eight bit input words, an output is presented to a digital comparator which is also responsive to a phase shift signal. The comparator digitally combines the signal from the look-up table indicating the pulse width modulation information with the phase displacement information and provides a switching waveform for use by the output stage switches of the inverter. In accordance with this switching waveform pattern, the individual switching elements in the inverter are transitioned between the conducting and the nonconducting states and the power output has the desired real and reactive components.

FIG. 4 of U.S. Pat. No. 4,251,735 illustrates an inverter output waveform having a selected number of transitions per cycle. There, a technique known as "end notching" is shown whereby the end of each half cycle is pulse width varied. This causes a change in the effective magnitude of the fundamental component out of the inverter. A desired fundamental component compatible with that of the power grid is often used by those skilled in the art to describe the voltage magnitude provided by the inverter output. As mentioned, the magnitude of the percent fundamental component controls the reactive power component and is directly proportional to the reactive power command signal magnitude. A feature of the Coleman invention was that the switching waveform generator can linearize voltage controller feedback so that the effective voltage out of the inverter decreases as the width of the notch increases in a linear manner. This is done by means of a multiplier in a feedback loop of the voltage controller.

In the prior art, as described above, the methods used to generate varying PWM waveforms used continuous modification of a fixed switching frequency pattern over a modulation range. With this method, it is possible to optimize harmonic cancellation at only one reactive power operating point.

Disclosure Of The Invention

The object of the present invention is to provide a method which provides the designer with the flexibility required to select advantageous harmonic cancellation at a plurality of fundamental voltages.

According to the present invention, a method for varying both the number of notches and their width, such that a plurality of variable frequency "pulse width modulated" (PWM) output waveform patterns are provided. Individual patterns for every operating point are stored in a memory. As mentioned, patterns may have different numbers of notches, i.e., may be of different "frequencies." Patterns may be grouped by "frequency" and the separate patterns within a frequency group will have different pulse widths. With this method, different frequency patterns can be designed for selection during operation over the entire modulation range for more advantageous harmonic cancellation.

In further accord with the present invention, for the case of inverters used in parallel with other energy sources, for lagging reactive power command signals, a stored pattern having a high number of transitions, or notches, i.e., a high "frequency," is selected and, for leading reactive power command signals, a low frequency pattern having a low number of transitions or notches is selected. A similar principle is used for the case of inverters used for independently supplying a load, except that there is only a voltage command. I.e., a high frequency is used for lower voltage commands while a lower frequency is used for higher voltage commands.

In still further accord with the present invention, for the case of an inverter in parallel with a utility grid, the notching of the various stored patterns is generally such that for leading reactive power command signals the pulse widths or notch magnitudes tend to be smaller in most cases. In some cases larger notches will exist for lower commands but these will tend to be nearer to zero crossover points. Similarly, for lagging reactive power command signals the pulse widths or notch magnitudes tend to become higher. In other words, the portion of a positive half cycle in which positive current is flowing is greater for leading reactive power command signals and smaller for lagging reactive power command signals. This is accomplished with smaller notches for leading commands and larger notches for lagging commands. For the case of an inverter which independently supplies a load, a similar principle applies except there is only a voltage command signal, as described above.

With this method or apparatus, each waveform pattern over the entire modulation range can be carefully selected for the desired percent fundamental by the designer for an advantageous harmonic cancellation.

These and other objects, features and advantages of the present invention will become more apparent in light of the detailed description of an embodiment thereof, as illustrated in the accompanying drawing.

Best Mode For Carrying Out The Invention

Figure 1:
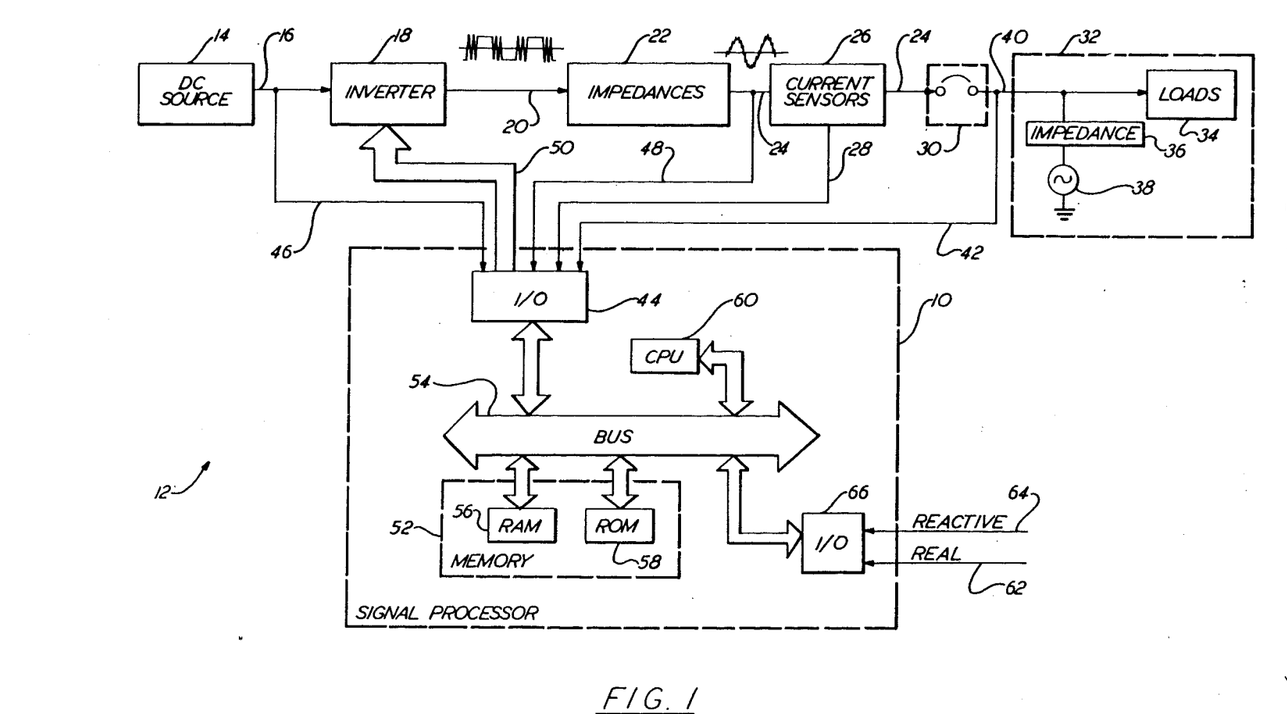
FIG. 1 is a simplified block diagram illustration of a force commutated inverter controlled by a signal processor controller, according to the present invention.

FIG. 1 is an illustration of a controller 10, according to the present invention, for controlling an inverter system 12 which includes a DC source 14 supplying DC on a line 16 to a force commutated inverter 18 which, in turn, provides a quasi-squarewave output on a line 20 to a paralleling impedance 22. A quasi-sinusoidal output waveform is provided on a line 24 to a current sensor 26 which provides an output signal on a line 28 indicative of the magnitude of the current on line 24. The output current continues on through the current sensor 26 on line 24 to a circuit breaker 30 which may be opened or closed in order to connect the output of the inverter to a utility grid 32 which includes various loads 34, an impedance 36 and a generalized source 38. The voltage of the utility buss on a line 40 is sensed on a line 42 and provided to an input/output (I/O) port 44 within the controller 10, which may be a signal processor. Control of the breaker may be effected in the controller 10, or may be effected elsewhere and is not described herein as it is not relevant to the invention. The I/O port 44 is also responsive to a signal on a line 46 which senses the DC output voltage from the DC source and to a signal on a line 48 which senses the voltage and phase of the quasi-sinusoidal waveform on the line 24. The output port 44 also provides a plurality of transition initiating signals on a line 50 for initiating transitions in the output stage switches of the inverter 18. The disclosed method and apparatus 10 for controlling the timing of these signals 50 is the subject matter of the present invention.

It will be understood that although the illustration of FIG. 1 shows an inverter in parallel with a utility grid, such that real and reactive power levels are of concern, the principles taught herein are equally applicable to the case of an inverter acting as the sole source for a load, in which case voltage control alone is of concern. Although much of the discussion contained herein is directed to the case of an inverter supplying a grid, it should be understood that the notching techniques and storage of patterns described herein for controlling reactive power are also applicable for simply controlling voltage for the case where a real power command signal is absent, i.e., for independent inverter operation.

The signal processor 10 includes a memory 52 which communicates with a data and control buss 54. The memory 52 may include random access memory 56 (RAM) and read only memory 58 (ROM). Of course, it will be understood that the memory units may be external to the signal processor. However, many microcomputers now have PROMs internally. A central processing unit 60 (CPU) also communicates with the data and control buss 54 and contains the necessary hardware for executing program steps stored in ROM 58 and RAM 56. The signal processor 10 is also responsive to a real power component command signal on a line 62 and a reactive power component command signal on a line 64 at an input/output port 66 (I/O). These two signals may be thought of as externally provided command signals which may be constant or of varying magnitudes depending on operating conditions on the utility grid 32. As described above, for independent inverters these signals would be replaced by a single voltage or percent fundamental command signal. The signal processor 10 responds to the reactive and real power command signals 62, 64 by providing the proper switching sequences for the signals on the lines 50. Of course, it will be understood that these two signals on the lines 62, 64 could be provided over a single communication link which may be analog or digital in format.

Figure 2:
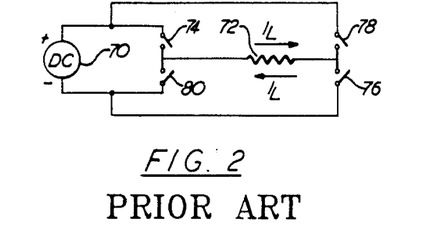
FIG. 2 is a simplified illustration of the basic principle involved in all inverters.
Figure 3:
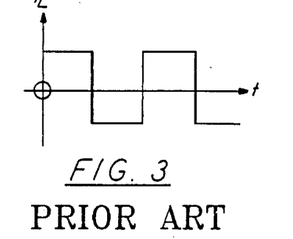
FIG. 3 is an illustration of the load current flowing through the load resistor of FIG. 2.

FIG. 2 is a simplified illustration showing a basic inverter including a DC source 70 which provides direct current through a load resistor 72 in one direction 73 when a first switch 74 and a second switch 76 are closed and which provides current in the other direction 77 when the first and second switches are open and a third switch 78 and a fourth switch 80 are closed. Of course, the third and fourth switches 78, 80 are open whenever the first and second switches 74, 76 are closed. The current through the load resistor 72 is illustrated in FIG. 3 and is seen to be an alternating current having a zero average. With suitable "end notching" and filtering the squarewave can be made to approximate a sinusoid suitable for supplying the utility grid 32 of FIG. 1.

Figure 4A:
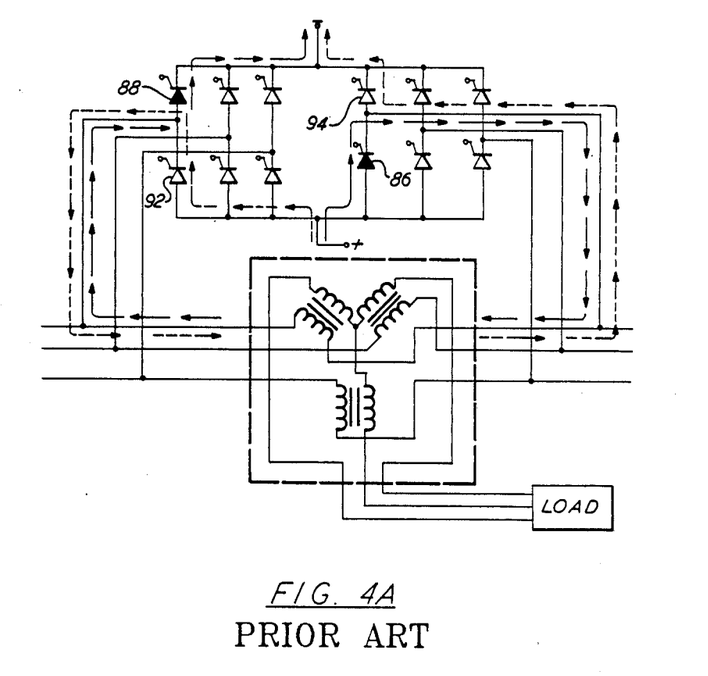
FIG. 4A is a simplified illustration of a full wave three-phase inverter, which is shown delivering alternating current to a three phase load.
Figure 4B:
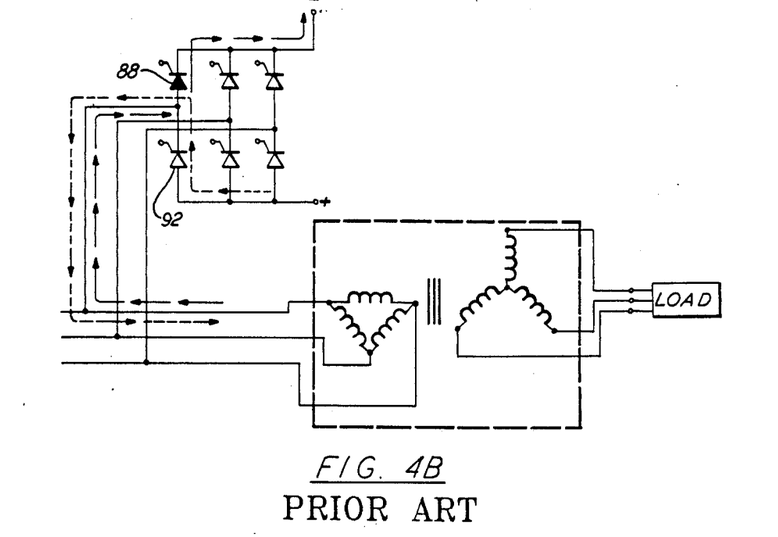
FIG. 4B is a simplified illustration of a six-device inverter utilizing an isolating three-phase transformer.

FIG. 4A illustrates the principle of FIG. 2 for a three-phase inverter using twelve thyristors or SCRs (high power semiconductor gate controlled switches) as the output stage switches. The inverter switches shown in FIG. 4A are of the force commutated type but the commutation method is not disclosed in detail in FIG. 4A for simplicity (but see FIG. 5). In any event, the illustration of FIG. 4A shows six series pairs of gate controlled switches, two of which are used for each full wave bridge per phase. For example, a pair of switches 86, 88 correspond to the first and second switches 74, 76 of FIG. 2 and conduct current as shown by the solid arrows through an associated one of the primaries of three single phase transformers connected for a three phase output during one half of an output cycle. Similarly, switches 92, 94 correspond to the switches 78, 80 of FIG. 2 and conduct current in the opposite direction through the same primary, as shown by the dashed arrows, during the other half of the cycle. The illustration of FIG. 4A shows an ungrounded system while that of FIG. 1 implies a grounded system. The only difference is the number of switching elements required but the principles are basically the same and the present invention is broadly applicable to either type. This circuit's output contains triplens or multiples of 3 times the fundamental which do not exist on a 3-phase transformer. While special modulation techniques make it possible to use a 3-phase transformer, it is advisable to use an isolating three phase transformer. Such a circuit is shown in FIG. 4B. This circuit avoids the triplen problem of the circuit of FIG. 4A.

Figure 5:
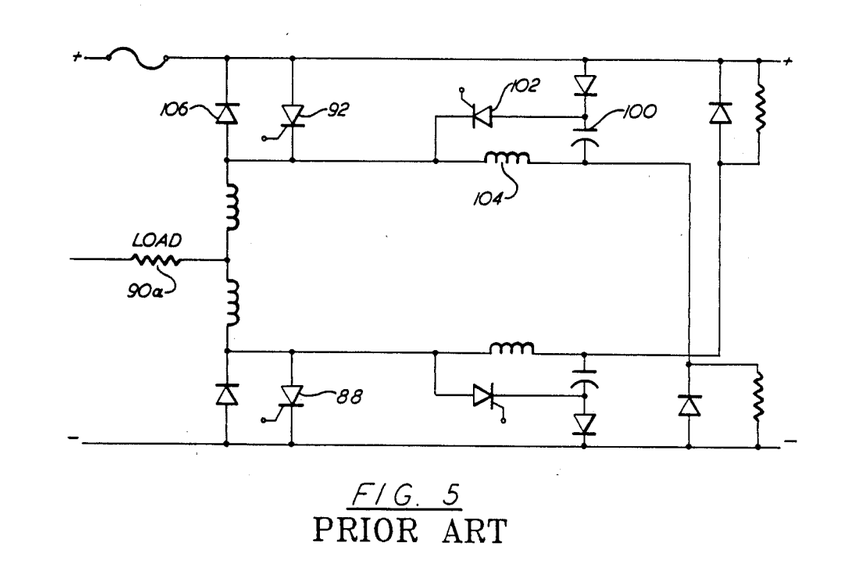
FIG. 5 is a simplified illustration of an individual commutation circuit.

A more detailed circuit diagram of an individual commutation circuit is shown in FIG. 5. Such a circuit will exist for pairs of thyristors such as thyristors 88, 92 of FIG. 4A and has been more fully disclosed and claimed in U.S. Pat. No. 4,358,820 entitled INVERTER WITH INDIVIDUAL COMMUTATION CIRCUIT, issued to Kenneth Lipman on Nov. 9, 1982 and assigned to the assignee of this patent. Suffice it to say that in order to turn-off a conducting thyristor, e.g., thyristor 92 in FIG. 5, a commutation capacitor 100 is precharged to approximately the magnitude and polarity of the DC buss. When a commutation thyristor 102 is turned on to initiate turn-off of thyristor 92, the capacitor 100 and an inductor 104 ring around for up to one period of the circuit time constant. During the first half-cycle the capacitor voltage is reversed. As the second half-cycle begins, current flows through an antiparallel diode 106 and through a load 90a until the combination commutation current is above the load current, at which point the main thyristor 92 is reverse biased and turned off with excess current flowing through the diode.

Figure 6:
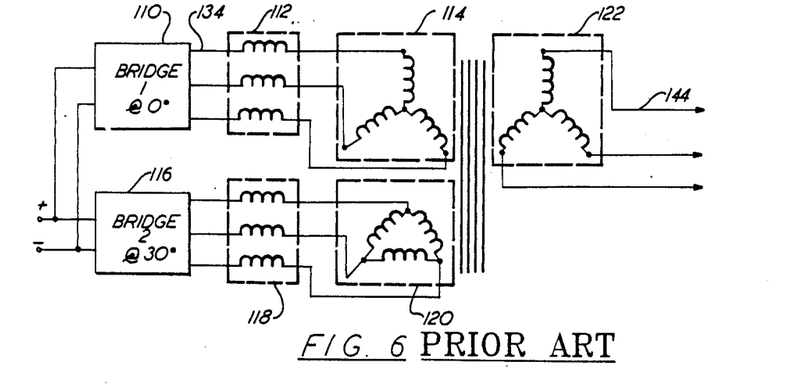
FIG. 6 is an illustration of a two-bridge inverter which may employ one or more inverter controllers according to the present invention.

FIG. 6 is an illustration of a two-bridge inverter as is well known in the art. Both Bridge 1 and Bridge 2 contain a three-phase bridge consisting of circuitry similar to that illustrated in FIG. 4B, whether grounded or ungrounded. A first Bridge 110 provides an output sinusoid current arbitrarily assigned a phase position of zero degrees. This current feeds a series impedance 112 and a wye-configured transformer primary 114. A second Bridge 116 produces an output sinusoid current which is displaced with respect to the output current of Bridge 1 by 30°. This displaced current feeds a series impedance 118 and also a delta connected transformer primary 120. The primaries 114, 120 are transformed on a secondary 122 which is wye-connected. The transformed Bridge 1 current appearing in the secondary is not shifted while the Bridge 2 current is shifted by 30°. The total current on any one phase of the secondary output is a combination of these two currents. As known to those skilled in the art, if two signals (current or voltage) are added to each other at an angle D the nth harmonic of each signal are displaced from each other by n×D and will cancel if the amplitudes of each are equal and n×D=180°. If pairs of signals are added from two sets of P phase signals this angle becomes 360°/2PN=180°/PN, or 60°/N for a three-phase system. This relationship is used in providing harmonic cancellation in a two-bridge three-phase inverter as disclosed by Udo H. Meier in U.S. Pat. No. 3,792,286, where various interconnection arrangements are illustrated for two phase displaced bridges driving two equally displaced load windings, to provide cancellation of the fifth and seventh harmonics of the output fundamental. In the Meier patent, as in FIG. 6, the corresponding phase outputs of the two bridges are relatively phase displaced by 30° (360°/2PN, where P=3, N=2) and the load windings are similarly displaced to provide a unity power factor fundamental signal to the load. Cancellation of the fifth and seventh harmonics occurs, in a three-phase reactor connected to the phase outputs of each bridge, as a direct result of the summation of two (N=2) sets of three (P=3) phase corresponding fundamental signals separated relatively displaced in phase by the angle 360/2PN=30°. Cancellation for only two-bridges is disclosed by Meier since his teaching can be extended to cases in which the number of bridges must be limited to powers of two to allow for successive addition of pairs. In U.S. Pat. No. 4,204,264 entitled HARMONIC CANCELLATION FOR MULTI-BRIDGE, THREE-PHASE CONVERTERS, inventor Kenneth Lipman disclosed a method of cancelling these fundamental harmonics, as well as others, in a three, five, six, or seven bridge inverter system. See also U.S. Pat. No. 3,876,923, to A. J. Humphrey et al which provides an extension of the Meier teaching. It will be realized that the two bridge format illustrated in FIG. 6 is merely one of many possible inverter architectures which may be employed with the present invention.

Figure 7:
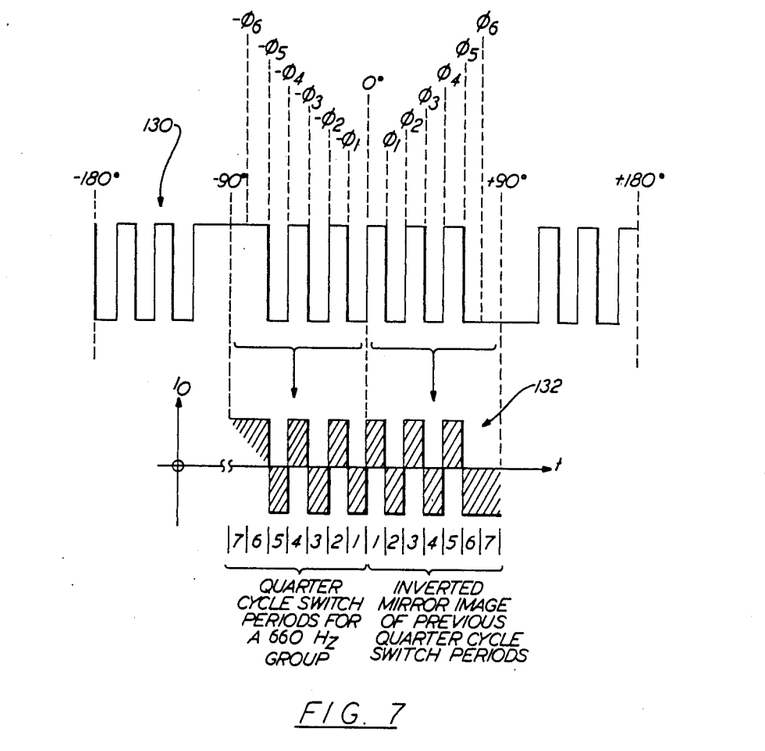
FIG. 7 is an illustration of a possible waveform pattern for initiating inverter output stage switch transitions and also showing the relationship of the transition initiating signals to the inverter output current.

FIG. 7 is an illustration of an inverter output stage switch transition initiating signal waveform 130 pattern juxtaposed with an inverter output waveform 132 which is caused by the inverter output stage switch transitions initiated by waveform 130. Referring first to waveform 130, it will be observed that the arbitrarily selected zero degree mark is preceeded by six negative phase angles marked at equal intervals between zero and −90° degrees. Similarly, for the positive quarter wave between zero and 90° there are marked out six equally spaced positive angles. The left-hand quarter wave is the inverted mirror image of the right-hand quarter wave in waveform 130. It will be observed that all of the selected angles coincide with actual transitions in the transition initiating signal waveform pattern 130 except for plus or minus $\phi_6$. In accordance with one embodiment of the present invention, for each quarter wave in a cycle, an opportunity is presented to the designer to provide one or more output transitions in a particular pattern such as are illustrated in waveform 132 up to a maximum number of transitions such as seven per quarter wave. The illustration of FIG. 7 shows only six transitions per quarter wave (including zero degrees) since the option has been made, in that case, not to make a transition at the plus or minus $\phi_6$ angles. It will be understood, in accordance with the present invention, that although the spacing between angles is shown to be equal, the normal design process will result in a wide variety of spacings between transitions according to the particular harmonics a particular designer wishes to minimize at a given operating point. Similarly, although the illustrated waveform 130 of FIG. 7 shows transitions occurring at each angle from $\phi_1$ through $\phi_5$ and not at $\phi_6$, there could be selected any combination of transitions or non-transitions for any particular angle in combination with any of the other angles illustrated, as will be more fully disclosed below in connection with FIGS. 8 and 9 and Table I.

Waveform 132 of FIG. 7 represents the current flowing in any one of the output phases of either of the Bridges 110, 116 of FIG. 6, e.g., the current on a line 134 in FIG. 6. It will be observed that the current from −90° to zero degrees is also the inverted mirror image of the current from zero degrees to +90°. The transitions are equally spaced, as in waveform 130 but, as will be subsequently disclosed in connection with FIGS. 8 and 9 and Table I, the pulse widths of the pulses shown in waveform 132 will also be varied according to designer's choice in minimizing selected harmonics. The present invention teaches that a transition initiating signal waveform such as waveform 130 which, fundamentally, varies at a 60 hertz rate (or at the rate of a utility grid which may be any frequency), may be characterized, for example, as a 660 hertz signal, or any other frequency higher than the frequency of the grid which is a multiple of the number of transitions during that cycle. Continuing the example of FIG. 7, the waveform 130 is characterized as a 660 hertz signal because there are eleven transitions per half cycle which, when multiplied by the frequency of the inverter output (corresponding to the utility frequency) yields 60×11 which equals 660 hertz.

It will also be observed from FIG. 7 that the inverted mirror images shown in waveform 132 may be characterized as sequences of successive mirror image time periods. In FIG. 7, there is a transition at the end of each time period except for the end of period number seven corresponding to negative $\phi_6$ in the left-hand quarter wave and at the end of period number six corresponding to positive $\phi_6$ in the right-hand quarter wave. Although time periods 6 and 7 are arbitrarily indicated in FIG. 7, the reason for selection of successive time periods will become apparent in connection with FIG. 11.

Figure 8:
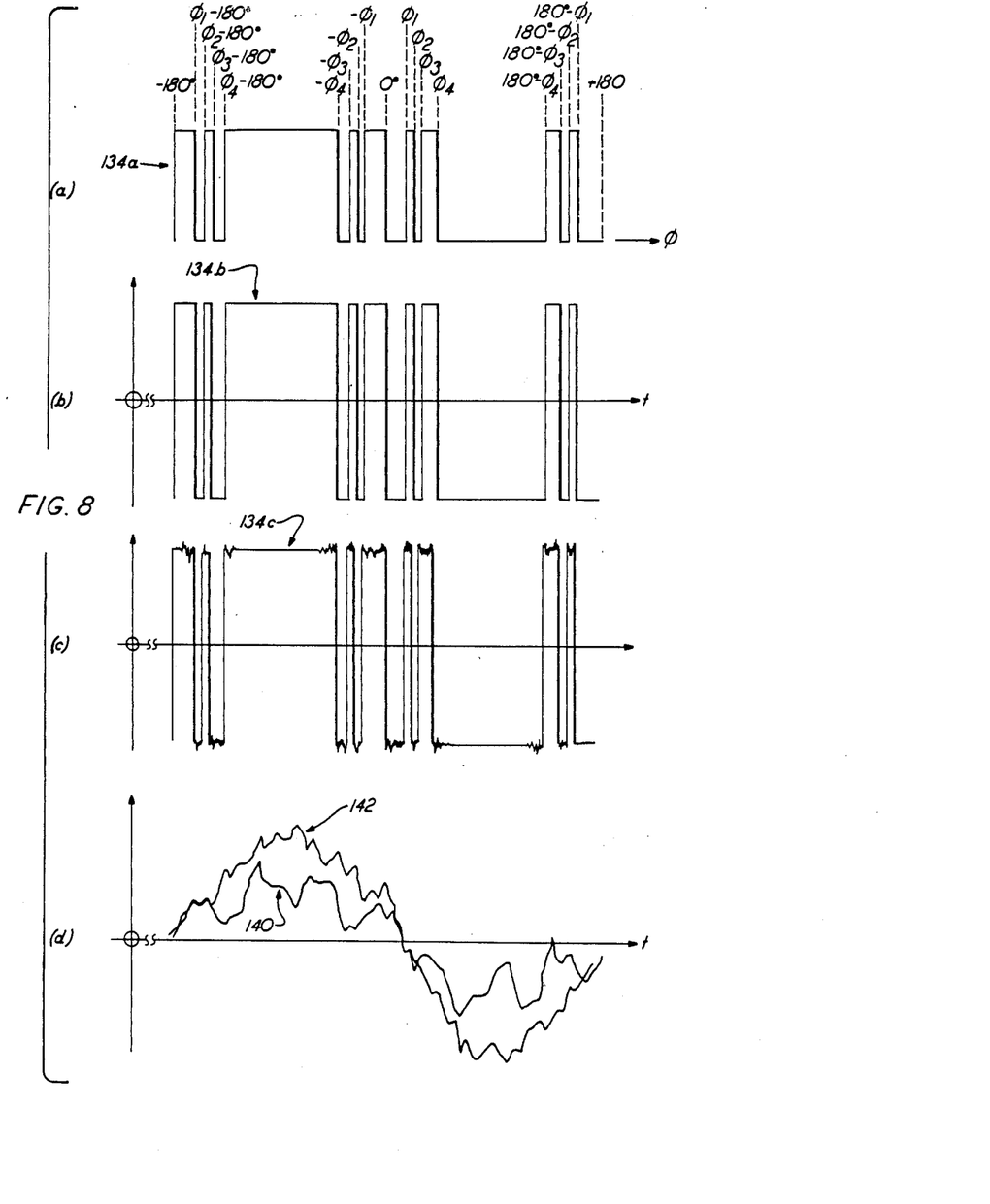
FIGS. 8(a)-(d) are illustrations of several waveforms illustrating a transition initiating signal for a 540 hertz waveform pattern and the resulting output currents.

FIG. 8(a) shows a transition initiating waveform 134 similar to waveform 130 of FIG. 7 except that the number of transitions in a half wave has been reduced to nine. This results in a "frequency" of 540 hertz, assuming a 60 hertz utility grid. It will be observed in FIG. 8 that only four transition angles are used per quarter wave and that the spacing between angles is not the same, unlike those appearing in FIG. 7. If one were to apply the voltage represented by the waveform 134a to the gates of thyristors 86, 88 of FIG. 4 and the inverse of waveform 134a to the gates of thyristors 92, 94, the resulting load current through the corresponding phase resistor 90a would ideally appear as shown in FIG. 8(b) as waveform 134b. The horizontal axis of FIG. 8(b) has been converted into time which is easily done using the relation t=$\phi$/21600, as known. FIG. 8(c) shows a more realistic load current as waveform 134c which has some ringing at the switch points. The output waveform 134c of FIG. 8(c) represents for example the current on the line 134 of FIG. 6, i.e., from one of the phases of one of the Bridges 110 or 116. (Similar waveforms would appear on each of the other phases of each of the bridges except shifted in time). If one were to assume that the negative side of the DC source of FIG. 6 is grounded, FIG. 8(d) represents, in a waveform 140, the voltage which would appear from line 134 to ground. A waveform 142 in FIG. 8(d) represents the voltage which appears on a line 144 in FIG. 6.

TABLE I

TRANSITION INITIATING SIGNAL TIMING (EXPRESSED FOR A QUARTER WAVE) FOR VARIOUS NORMALIZED REACTIVE POWER COMMAND SIGNAL LEVELS FOR FIVE "FREQUENCY" GROUPS

| STEP | REAC PWR | "FREQ" | $\phi_1$ | $\phi_2$ | $\phi_3$ | $\phi_4$ | $\phi_5$ | $\phi_6$ |
|---|---|---|---|---|---|---|---|---|
| 1 | .956 | 300 | 3.2 | 12.5 | | | | |
| 2 | .947 | 300 | 11.4 | 17.5 | | | | |
| 3 | .935 | 300 | 15.7 | 21.5 | | | | |
| 4 | .924 | 300 | 18.2 | 24.25 | | | | |
| 5 | .912 | 300 | 19.8 | 26.25 | | | | |
| 6 | .912 | 420 | 9.1 | 24.8 | 28.8 | | | |
| 7 | .899 | 420 | 9.5 | 24.9 | 29.5 | | | |
| 8 | .878 | 420 | 10.0 | 24.9 | 30.5 | | | |
| 9 | .867 | 420 | 10.3 | 24.8 | 31.0 | | | |
| 10 | .853 | 420 | 10.6 | 24.6 | 31.5 | | | |
| 11 | .846 | 420 | 10.8 | 24.6 | 31.8 | | | |
| 12 | .839 | 420 | 10.9 | 24.5 | 32.0 | | | |
| 13 | .832 | 540 | 10.9 | 19.4 | 31.4 | 36.0 | | |
| 14 | .823 | 540 | 10.8 | 19.7 | 31.3 | 36.2 | | |
| 15 | .812 | 540 | 10.7 | 20.1 | 31.3 | 36.5 | | |
| 16 | .800 | 540 | 10.6 | 20.4 | 31.2 | 36.8 | | |
| 17 | .790 | 540 | 10.6 | 20.7 | 31.1 | 37.0 | | |
| 18 | .782 | 540 | 10.5 | 20.9 | 31.1 | 37.1 | | |
| 19 | .772 | 540 | 10.4 | 21.2 | 31.0 | 37.4 | | |
| 20 | .763 | 540 | 10.3 | 21.5 | 30.9 | 37.6 | | |
| 21 | .754 | 540 | 10.2 | 21.8 | 30.9 | 37.8 | | |
| 22 | .743 | 540 | 10.1 | 22.0 | 30.8 | 38.0 | | |
| 23 | .734 | 540 | 9.9 | 22.3 | 30.8 | 38.1 | | |
| 24 | .725 | 540 | 9.8 | 22.6 | 30.7 | 38.3 | | |
| 25 | .716 | 540 | 9.7 | 22.9 | 30.7 | 38.5 | | |
| 26 | .707 | 540 | 9.6 | 23.1 | 30.6 | 38.6 | | |
| 27 | .698 | 540 | 9.5 | 23.4 | 30.6 | 38.8 | | |
| 28 | .689 | 540 | 9.4 | 23.7 | 30.6 | 39.0 | | |
| 29 | .680 | 540 | 9.2 | 24.1 | 30.5 | 39.2 | | |
| 30 | .671 | 540 | 9.1 | 24.3 | 30.5 | 39.4 | | |
| 31 | .664 | 540 | 9.0 | 24.5 | 30.5 | 39.5 | | |
| 32 | .653 | 540 | 8.8 | 24.9 | 30.5 | 39.7 | | |
| 33 | .654 | 660 | 11.9 | 23.3 | 31.2 | 46.9 | 52.0 | |
| 34 | .646 | 660 | 12.3 | 23.2 | 31.6 | 45.9 | 52.3 | |
| 35 | .638 | 660 | 12.4 | 23.2 | 31.8 | 45.6 | 52.4 | |
| 36 | .631 | 660 | 12.5 | 23.2 | 31.9 | 45.6 | 52.5 | |

TABLE I-continued
TRANSITION INITIATING SIGNAL TIMING (EXPRESSED FOR A QUARTER WAVE) FOR VARIOUS NORMALIZED REACTIVE POWER COMMAND SIGNAL LEVELS FOR FIVE "FREQUENCY" GROUPS

| STEP | REAC PWR | "FREQ" | $\phi_1$ | $\phi_2$ | $\phi_3$ | $\phi_4$ | $\phi_5$ | $\phi_6$ |
|---|---|---|---|---|---|---|---|---|
| 37 | .622 | 660 | 12.6 | 23.2 | 32.0 | 45.6 | 52.6 | |
| 38 | .613 | 660 | 12.7 | 23.1 | 32.2 | 45.8 | 52.7 | |
| 39 | .606 | 660 | 12.8 | 23.1 | 32.3 | 45.4 | 52.8 | |
| 40 | .599 | 660 | 12.9 | 23.0 | 32.4 | 45.9 | 52.9 | |
| 41 | .591 | 660 | 13.0 | 23.1 | 32.5 | 45.3 | 53.0 | |
| 42 | .583 | 660 | 13.1 | 23.0 | 32.6 | 45.2 | 53.1 | |
| 43 | .576 | 660 | 13.2 | 23.0 | 32.7 | 45.2 | 53.2 | |
| 44 | .569 | 660 | 13.3 | 23.0 | 32.8 | 45.1 | 53.3 | |
| 45 | .561 | 660 | 13.4 | 23.0 | 32.9 | 45.1 | 53.4 | |
| 46 | .555 | 660 | 13.5 | 23.0 | 33.0 | 45.0 | 53.5 | |
| 47 | .547 | 660 | 13.6 | 22.9 | 33.1 | 44.9 | 53.6 | |
| 48 | .541 | 660 | 13.6 | 22.9 | 33.2 | 44.9 | 53.7 | |
| 49 | .541 | 780 | 6.6 | 18.0 | 26.9 | 35.9 | 46.5 | 54.3 |
| 50 | .534 | 780 | 6.6 | 18.1 | 26.8 | 35.9 | 46.4 | 54.4 |
| 51 | .527 | 780 | 6.5 | 18.1 | 26.8 | 36.0 | 46.4 | 54.5 |
| 52 | .520 | 780 | 6.5 | 18.2 | 26.7 | 36.1 | 46.3 | 54.6 |
| 53 | .514 | 780 | 6.4 | 18.3 | 26.7 | 36.2 | 46.2 | 54.6 |
| 54 | .507 | 780 | 6.4 | 18.3 | 26.6 | 36.2 | 46.2 | 54.7 |
| 55 | .500 | 780 | 6.3 | 18.4 | 26.6 | 36.3 | 46.1 | 54.8 |
| 56 | .495 | 780 | 6.3 | 18.4 | 26.5 | 36.4 | 46.0 | 54.8 |
| 57 | .488 | 780 | 6.2 | 18.5 | 26.5 | 36.4 | 46.0 | 54.9 |
| 58 | .481 | 780 | 6.2 | 18.5 | 26.4 | 36.5 | 46. | 55.0 |
| 59 | .474 | 780 | 6.1 | 18.6 | 26.4 | 36.6 | 45.9 | 55.1 |
| 60 | .470 | 780 | 6.1 | 18.6 | 26.4 | 36.6 | 45.8 | 55.1 |

Table I shows 60 separate patterns grouped in five separate frequency groups ranging from 300 to 780 hertz. The patterns are arranged in steps numbered from 1 through 60, each corresponding to a particular reactive power command signal level. Of course, for an inverter operating independently there would then be simply a voltage command and no reactive power command and, of course, no real power command. The reactive power command signal levels in Table I are normalized in the table and are proportional to the "percent fundamental" in the output. Percent fundamental is defined as $4/\pi\sqrt{2}$ times the peak voltage. For leading reactive power command signal levels, lower frequencies are used. This is due to less "notching" producing leading voltages.

It has been the practice in the prior art, as disclosed by Coleman in U.S. Pat. No. 4,251,735, to store the predetermined width of each notch in the switching pattern in a digital format which is confined to a single "frequency." It is a central teaching of the present invention, on the other hand, to provide a whole range of groups of stored variable pulse width patterns, each group having a different frequency. The lower frequency groups are used for leading reactive power command signals while the higher frequency groups are used for lagging reactive power command signals. Within any particular group, the pulse widths will be varied in order to provide more or less positive voltage during positive half-cycles and similarly provide more or less negative output voltage during negative half-cycles depending on the type and level of reactive power commanded.

The particular angles selected depends on the designer's choice for reducing particular harmonics for a particular hardware design. In the case illustrated in Table I, a two-bridge inverter similar to that illustrated in FIG. 6 was used, the paralleling impedances 112, 118 having particular values and the output transformers 114, 120, 122 having a particular configuration, all of which were taken into account in selecting the angles illustrated. Therefore, it will be understood that the angles disclosed are of no general significance except to show the result of one particular designer's choices using the flexibility provided by the teachings of the present invention.

Of prime importance in selecting the angles illustrated in Table I, in addition to the impedance values and structure of the components, was the effect the particular selected angles had in reducing undesirable harmonic content in the output wave appearing on line 144 of FIG. 6 and on the other output lines as well. The approach which may be taken by a designer using the teachings disclosed herein would be to decide what would be the maximum number of transitions necessary to achieve the desired harmonic reductions and to set aside sufficient space within the signal processor memory to store the desired number of groups of patterns at the selected frequencies and to then go through the mathematical analysis required to achieve the reduction of the selected harmonics. There are of course an infinite variety of possible numbers of angles and spacings therebetween which may be selected freely according to the particular design dictates and the present invention provides the flexibility to do just that.

Figure 9:
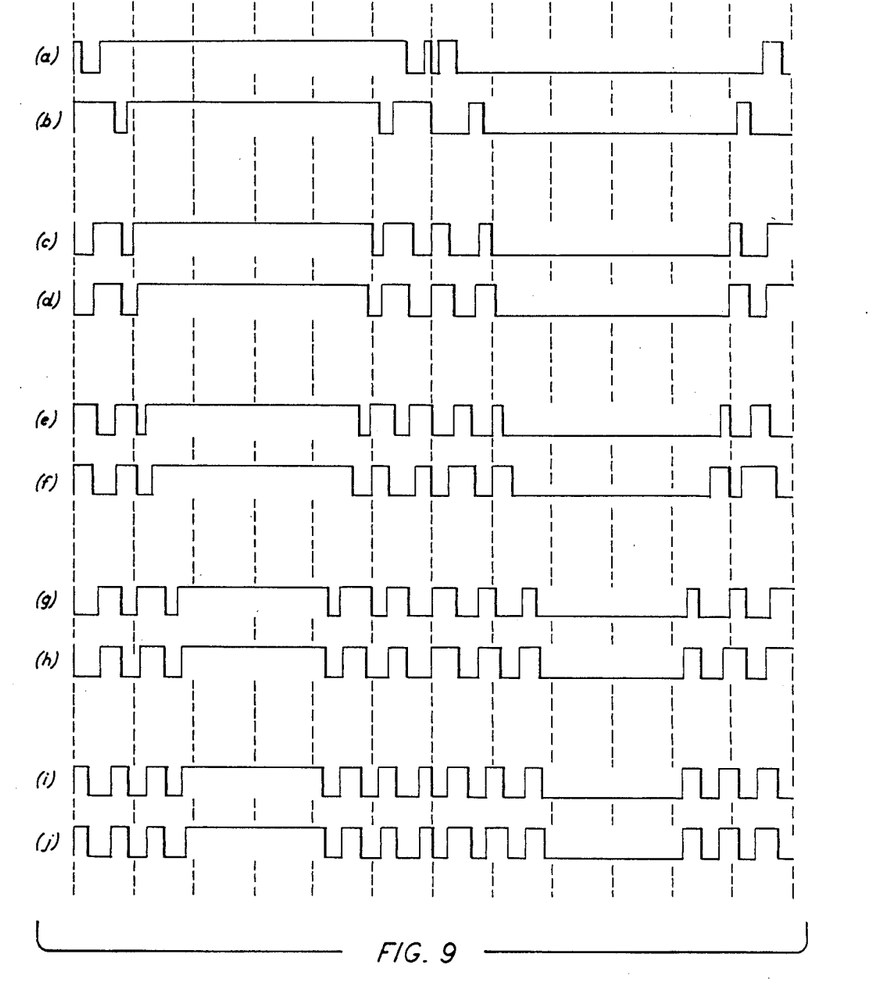
FIGS. 9(a)-(f) illustrate five pairs of transition initiating signals, each pair representing the first and last waveform from the five frequency groups of Table I.

FIG. 9 is an illustration of some of the transition initiating signal patterns contained in Table I. Specifically, the first and last waveform patterns from each group are shown in pairs. For example, FIG. 9(a) and FIG. 9(b) represent the first and fifth steps illustrated in Table I, being the first and last patterns in the 300 hertz group. It will be observed by examining the reactive power column for that first group that the first step, which corresponds to a higher level of reactive power, will result in a smaller magnitude output sinusoid at the output of the inverter. Although there appears to be a greater degree of positive voltage duration during the positive half-cycle of FIG. 9(b) the positioning of the notches between FIGS. 9(a) and (b) heavily influence the magnitude of the output sinusoid. Thus, although the magnitude of the notch of FIG. 9(a) is wider than that of FIG. 9(b), the narrower notch of FIG. 9(b) causes more of a reduction in the total overall magnitude of the output sinusoid than the notch of FIG. 9(a) because the notch of FIG. 9(a) is nearer to the zero crossover point and therefore has a lesser effect on the output voltage magnitude. I.e., it has a lesser effect for the same magnitude notch than it would if positioned further away from the zero crossover point. In general, however, it may be said that wider notches tend to decrease output voltage, all other things being equal.

Figure 10:
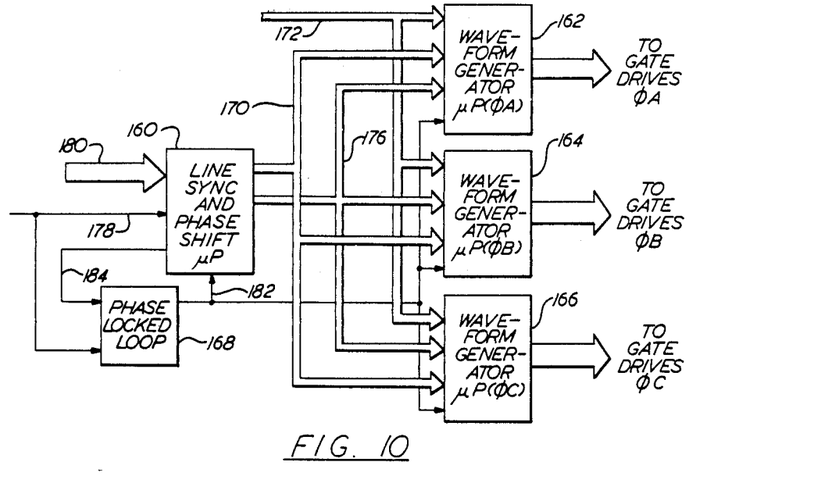
FIG. 10 is an illustration of a basic inverter control, according to the present invention.

FIG. 10 is an illustration of a signal processor controller such as illustrated in FIG. 1 except that a plurality of central processing units are used as embodied in separate microprocessors. These include a line synchronization and phase shift microprocessor 160, and three separate waveform generator microprocessors 162, 164, 166 for each output phase of the three-phase output of the inverter. A phase locked loop 168 is also provided. The function of each waveform generator is to produce the sequence of thyristor switch commands required for the inverter to generate a pulse width modulated waveform pattern which has the proper percent fundamental voltage and also has the proper phase relationship with respect to the utility line to produce, respectively, the required reactive and real power output.

Figure 14:
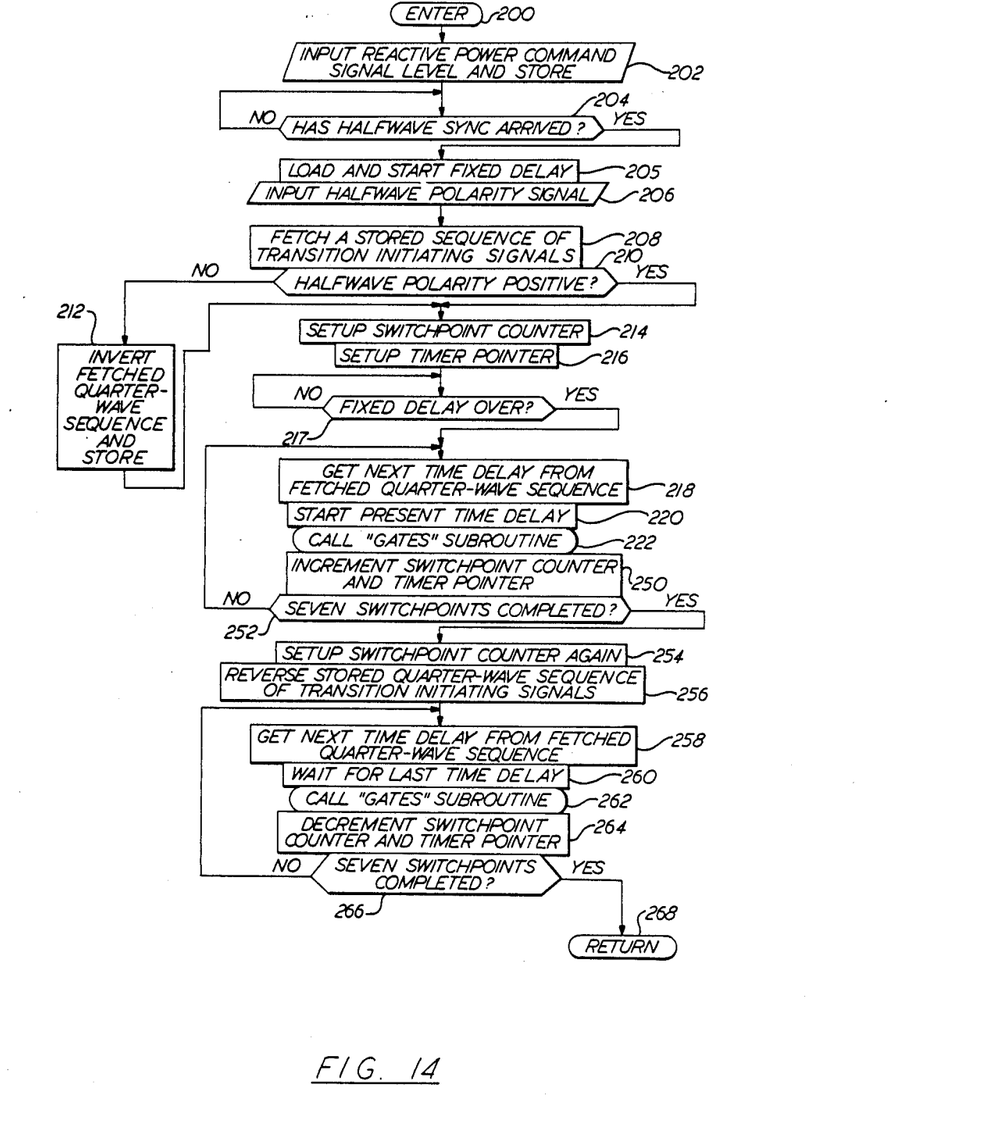
FIG. 14 is a simplified flowchart illustration of a control flowchart for controlling the inverter output stage switches, according to the present invention.

Upon receipt of an external synchronization pulse on a line 170, the waveform generator begins to generate an output pattern in accordance with the algorithm of FIG. 14. (The flowchart of FIG. 14 is only briefly described at this point, but will be covered in greater detail subsequently). First, it selects a particular fixed half-cycle waveform pattern from a set of sixty stored patterns by reading the reactive power command or percent fundamental input data provided on a line 172. Then it determines the required starting polarity of the waveform. If the polarity is negative it inverts the stored pattern since the negative half-cycle of the PWM pattern will become the mirror image of the positive half-cycle after reversal.

Figure 11:
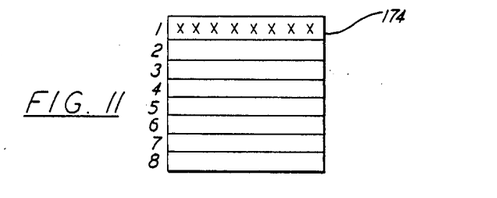
FIG. 11 is a data map for storing a one quarter wave pattern.

Each waveform pattern is stored as a table of eight values as depicted in FIG. 11. The first value is stored as seven bits of a byte 174 which represents polarities of the seven switch points in the pattern. A zero may be used to indicate a negative thyristor polarity switch (e.g., switch 88 of FIG. 4) point in a pattern at a particular time and a one to indicate a positive thyristor polarity switch (e.g., switch 86 of FIG. 4) point. The succeeding values stored in the remaining seven bytes contain the time duration between switch points. When each time duration has completed, the corresponding switch point polarity is determined from byte 174 and an output switch sequence then takes place if there is to be a change in polarity (see FIG. 15 where no transition initiating signals are provided unless there is a change in polarity).

The stored waveform pattern represents only 90° or one half of the half-cycle since the second quarter wave of the half-cycle is the mirror image of the first quarter wave (reversed and inverted). Therefore, at the completion of the seven switch points the pattern is reversed and inverted and the sequence is then repeated, in accordance with the flowchart of FIG. 14. At the end of the two quarter wave sequences the algorithm of FIG. 14 repeats itself by returning to the beginning where it waits for the next synchronizing pulse.

Referring back to FIG. 10, the function of the line sync and phase shift microprocessor 160 is to provide each of the three waveform generator microprocessors 162, 164, 166 with two signals, twice each cycle (six signals total). The first signal sent to each waveform generator is the halfwave sync pulse on the line 170. Line 170 is shown as a plurality of lines between the line sync processor and each of the waveform processors but may be single lines between the line sync processor and each of the waveform processors. A similar statement can be made for line 176. The second signal sent is a polarity signal on a line 176 indicating the polarity of the output waveform for that half-cycle. The phase displacement between the signals sent to each microprocessor is fixed at 120°.

Another function of the line sync and phase shift microprocessor is to synchronize the three halfwave sync pulses described above with a 60 hertz input squarewave provided on a line 178 and which is slaved to the utility line. Still another function of the line sync and phase shift microprocessor 160 is to shift the synchronized halfwave sync pulses on the line 170 with respect to the input 60 cycle synchronization signal on the line 178 in response to an eight bit phase shift data input on a line 180 from an external interface microprocessor. This phase shift of the output waveforms produced by the waveform generators controls the real power component delivered by the inverter.

The line sync and phase shift microprocessor 160 may be an Intel 8749 Microcomputer and the phase locked loop 168 may be a Motorola MC 14046B. As discussed, the inputs to the line sync and phase shift microprocessor include a 60 hertz synchronization pulse on a line 178. This is a squarewave which is synchronized to the line voltage from phase A to neutral. This signal must lag the phase A line voltage by 30° because the basic inverter control output in the illustrated case, e.g., for Bridge 2 of FIG. 6 has a net 30° lead which must be cancelled so that the thyristor switch outputs of the waveform microprocessors will be in phase with the line. Another input is the phase shift data on line 180 which is an eight, bit signed number representing a phase shift of plus or minus 15° at ⅛th degree per bit. A value of zero to +127 equals a leading phase shift and zero to −127 equals a lagging phase shift. Another input receives a 180 KHz squarewave input signal on a line 182 from the phase locked loop (PLL). The PLL 168 synchronizes the 60 hertz line pulse on line 178 with a 60 hertz feedback squarewave output on a line 184 from the microprocessor 160 by varying the 180 KHertz squarewave frequency on the line 182 which in turn functions as a timer clock for microprocessor 160 and also for the three waveform generator microprocessors 162, 164, 166.

The sync pulses provided on line 170 are provided at the rate of one "halfwave sync pulse" every half-cycle (180°). A succession of three pulses are separately sent per cycle to the three waveform microprocessors 162, 164, 166 (separated by 120°) to synchronize the waveforms produced by the microprocessors to the thyristors in order that the output of the inverter will be in sync with the three phase utility line. As mentioned, each synchronizing pulse associated with a particular phase is kept at a fixed 120° relationship with respect to each of the other two sync pulses for the other two phases. Note, as disclosed below in connection with FIG. 12, that each group of three pulses on the line 170 generated in response to a line sync pulse on the line 178 are given an additional 60° lag by the processor 160. Since the waveform generator microprocessor 160 imparts a 90° phase lead (by virtue of the stored waveform pattern (see FIG. 7) starting at −90°)to the incoming sync pulses, the output to the gate drives of the respective phases have a 30° phase lead. This is why the sync input is shifted by a lagging 30° so that the thyristor switch outputs of the waveform microcomputers will be in phase with the line phases.

As mentioned, each of the three waveform generator microprocessors 162, 164, 166 is sent a polarity pulse on the line 176, along with the synchronization pulse on the line 170, in order to define the polarity of the half-cycle started by the synchronizing pulse. The generation of the halfwave sync pulses and the accompanying polarity signals will now be discussed in detail.

Figure 12:
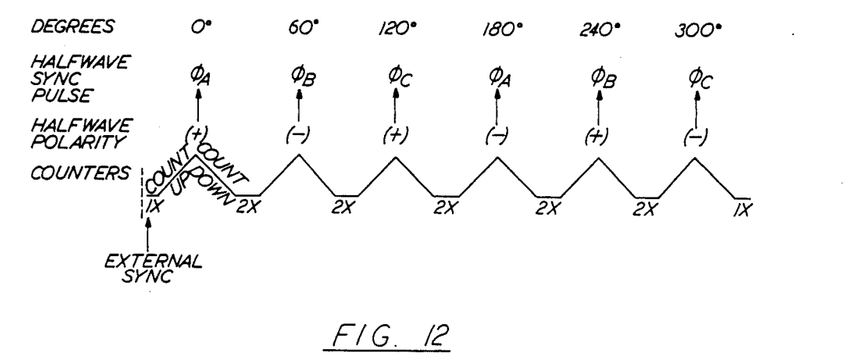
FIG. 12 is an illustration of a line synchronization and phase shift timing diagram for a three-phase system.
Figure 13:
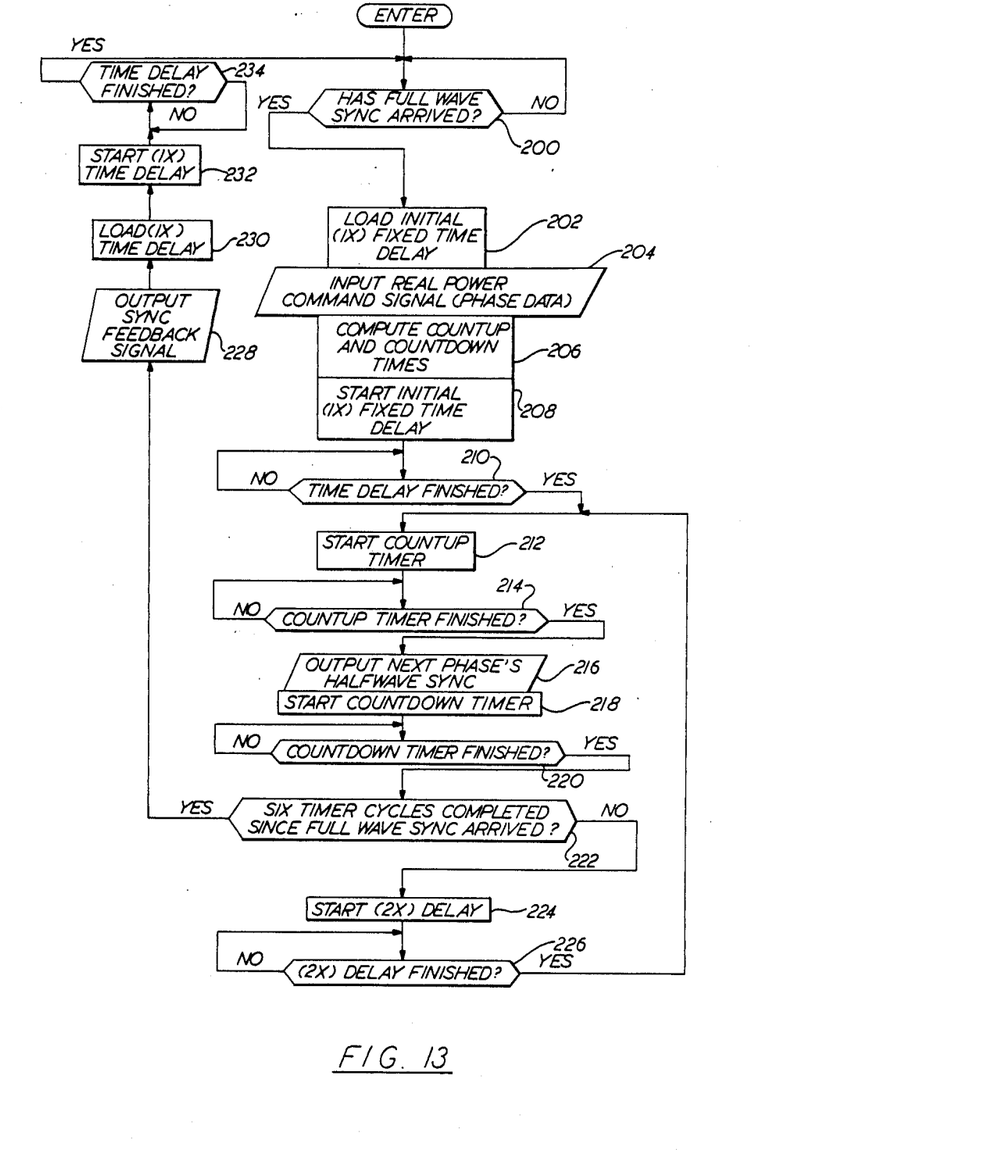
FIG. 13 is a simplified flowchart illustration of the logical steps executed by a signal processor in order to provide the half wave sync pulses illustrated in FIG. 12, according to the present invention.

Referring now to FIGS. 12 and 13, each successive 360° cycle is accompanied by an external 60 hertz sync pulse on a line 178 which starts a timing sequence whose output is six evenly spaced synchronization pulses and associated waveform polarity signals. Note in FIG. 12 that the first synchronization pulse for phase A lags the external sync input provided on line 178 in FIG. 10 by 60°, as described above. The timing sequence consists of six repetitions of a timer internal to the line sync and phase shift microprocessor 160 which counts "up" to a count and produces an output pulse on line 170 and then counts down. There is a short fixed delay between each timer count up/count down sequence to allow the microprocessor program to perform "housekeeping" functions. In order to assure that the timing sequence of six pulses is exactly 360° in duration, the internal timer's clock is externally produced by a phase locked loop 168 running at an even multiple of 60 hertz. The phase locked loop synchronizes the 60 hertz input synchronization signal on the line 178 to a feedback signal on the line 184 produced by the processor 160 at the end of its timing sequence. The phase locked loop 168 of FIG. 10 was selected to run at 180 KHz which results in 3,000 timer counts in the 360° interval shown in FIG. 12. Each count thus represents approximately ⅛th degree.

Phase shifting for real power control of the six output sync and polarity signals on the lines 170, 176 is accomplished by adding a variable "count" to the count up timer and subtracting the same "count" from the count down timer. In this way the total count remains the same but the timing of the pulses is shifted. The value of the variable count is determined from the eight bit phase shift data input on the line 180 to the microprocessor 160 from an external interface microprocessor (not shown). The phase shift can be either lagging or leading depending on whether the value on the eight bit phase shift data input is positive or negative. The phase data is an eight bit signed number so that the timer value can be increased or decreased by 127 counts, representing a plus or minus 15¼° phase change since each count represents approximately ⅛th degree.

Referring now to FIG. 13, after the external fullwave sync on the line 178 has arrived as determined by a decision step 200, a fixed delay (1X) of 100 counts is loaded in a step 202 which allows the microprocessor to perform "housekeeping." A step 204 is next executed in which the magnitude of the real power command signal on line 62 of FIG. 1 is input. This provides the necessary phase data represented on line 180 of FIG. 10 as an eight bit digital signal. Of course, at some point an analog-to-digital conversion process must take place if the real input signal is analog in form. A step 206 is next executed in which the count up and count down times are computed according to the value of the real power command signal input in step 204. The fixed time delay previously loaded in step 202 is next started in a step 208. Of course, it will be understood that the fixed timer could have been started as soon as it was loaded in step 202. It will also be understood that the precise sequence of many other steps disclosed in this FIG. 13 and in the flowcharts of FIGS. 14 and 15 can easily be rearranged to obtain similar results. After completion of the initial delay, as determined in a decision step 210, the count up timer is started in a step 212. After completion of the count up, as determined in a step 214, a phase's halfwave sync pulse is output on the line 170. This would include the polarity signal on the line 176 as well. The count down timer is immediately started in a step 218 and then times out as determined by a step 220. A step 222 next determines if six timer cycles have been completed since the fullwave sync pulse first arrived. If not, a fixed time delay is started in a step 224. After the fixed delay of step 224 has timed out as determined in a step 226, a repetitive sequence of count up, output pulse, count down and fixed (2X) time delays (e.g., 200 counts) is repeated six times. Additional housekeeping functions may be executed during the (2X) time delay between count ups and counts downs. At the end of the six delays the phase lock loop feedback pulse is output as indicated by a step 228 and the processor next loads a time delay equal to that loaded in step 202 in a step 230. The time delay is started in step 232 and the processor waits in a step 234 until time out. After time out, the processor next reexecutes step 200 and waits for a fullwave sync pulse to arrive on line 178 of FIG. 10. Because of the slightly frequency varying nature of the utility grid, the sync pulse may actually occur exactly at the end of this delay or slightly sooner. If this occurs, the phase lock loop will correct the timer frequency so that the program starts looking for the external sync pulse somewhat sooner.

Referring back to FIG. 10, as mentioned, the function of each of the waveform generators is to produce the sequence of thyristor switch commands required for the inverter to generate a pulse width modulated waveform pattern which has the proper percent fundamental voltage and also has the proper phase relationship with respect to the utility line to produce, respectively, the required reactive and real power output components.

Referring now to FIG. 14, a series of steps are there illustrated which generally show the manner in which the waveform generators 162, 164, 166 of FIG. 10 are controlled. Upon entering the group of steps shown in FIG. 14 in a step 200, a step 202 is next executed in which the present value of the reactive power command signal on the line 172 in FIG. 10 is input to the individual waveform generators and stored. A step 204 is next executed in which a determination is made as to whether or not a halfwave sync signal has arrived on an associated line 170 as shown in FIG. 10. If not, the question is repeatedly posed until an affirmative answer is obtained. Once a halfwave sync signal has arrived, a step 205 is next executed in which a fixed time delay is started. This is the time from the −90° sync pulse to the first switchpoint. This fixed delay allows the microprocessor to perform "housekeeping." Then a step 206 is next executed in which the polarity of the next halfwave is determined by reference to the value of the halfwave polarity signal on the line 176 in FIG. 10. Next, a stored sequence of transition inititating signals is fetched in a step 208. These correspond to the magnitude of the stored reactive power command signal input in step 202. There are 60 patterns stored and the eight bit reactive power command signal input specifies one of the patterns. Each pattern is stored as a table of eight values (bytes). Seven bits of the first value 174 specify the polarity of the seven switch points in the pattern (see FIG. 11). The next seven bytes contain seven values corresponding to time durations between each switch point. The number stored corresponds to a value loaded into a timer counter running at 180 KHz; thus, each "count" corresponds to 5.5 microseconds and the maximum count (corresponds to the maximum width between switch points) is 1.4 milliseconds or 30°. The Intel 8749 Microprocessor stores program data in "pages" of 256 byte length. Two pages are thus required to store sixty-four waveform patterns. The retrieval of the correct waveform pattern from memory involves determining which page the data is stored in and then relocating that data to a temporary storage register for rapid access during program execution. The first 30 patterns are stored in one page and the last 30 in another page.

A step 210 next determines whether the halfwave polarity signal indicates that the next half-cycle is to be positive or negative. If negative, a step 212 is executed in which the fetched quarterwave sequence is inverted and stored for immediate use and a step 214 is next executed in which a switch point counter is set up. The switch point pointer serves as both pointer for a specific switch point polarity bit and as counter for the number of repetitions of the present switch sequence. After pattern retrieval in step 208, the input polarity bit is checked in step 210 to determine if this is a positive or negative half-cycle. I.e., the pattern polarity data stored in byte one is complemented. At the same time (not shown) a pole voltage status flag is also complemented (this flag may be used, although not shown, in the subroutine of FIG. 15 to be described in more detail below, during a thyristor switch sequence to determine if the polarity of the previous switch point is the same as the polarity of the previous switch point, i.e., whether a change in pole voltage is necessary). A timer pointer is next set-up in a step 216. If the halfwave polarity had been found to be positive in step 210, step 214 is executed directly without inverting the fetched quarterwave sequence.

The microprocessor will be ready to begin generating the waveform pattern once the fixed delay to the first switchpoint is completed. The switch point counter set-up in step 214 permits repetition of the steps about to be described seven times corresponding to the seven switch points. A data pointer is also set-up to retrieve successive timer values through the seven repetitions. As mentioned, note that the switch point counter serves a dual purpose. It is actually a "mask" bit whose position is shifted on each repetition to "point" at the correct polarity bit in the PWM pattern byte (see the thyristor switch sequence subroutine of FIG. 15). When this bit is finally shifted past the most significant bit of the pattern byte the "counter" value becomes zero which indicates the all seven pattern bits have been used.

When the fixed delay is completed, a step 218 is next executed in which the next time delay is loaded from the stored sequence of transition initiating signals according to which byte the timer pointer is presently indicating. On the first pass through, the timer pointer is pointing to the second byte i.e., the first byte after the PWM polarity byte and the next (subsequent) time delay obtained in step 218 is from the third byte. The next time delay is stored in a temporary location and the present time delay is started in a step 220. The next time delay obtained in step 218 is held in readiness since it must be immediately started after the present time delay expires. A step 222 next calls the "GATES" subroutine illustrated in FIG. 15.

Figure 15:
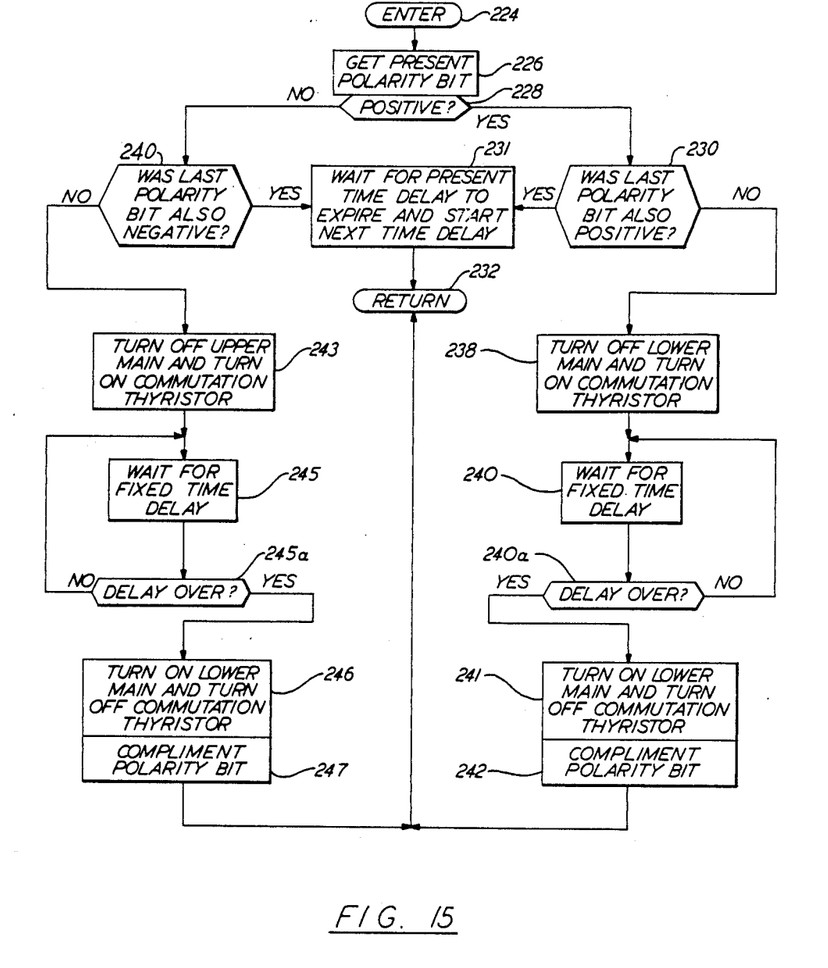
FIG. 15 is a simplified flowchart illustration of the "GATES" subroutine referred to in FIG. 14.

Referring now to FIG. 15, the first step of the GATES subroutine, after entering at a step 224, is to get the present switch polarity bit in a step 226 from the switch point counter. A determination is made in a step 228 as to whether to not this present polarity bit is positive or not. If so, a determination is made in a step 230 as to whether the last polarity bit (the present switch state) was also positive. If so, no transition is required and a step 231 is next executed in which the processor waits for the present time delay to expire and then starts the next time delay loaded in step 218. A return is then made in step 232 to the flowchart of FIG. 14 at the point of departure so that execution may be picked up where it was left off. If the last polarity bit was not positive the processor executes a step 238 to turn-off the conducting output switch (negative switch; lower main), turn-on the negative switch commutation thyristor and, as indicated in a step 240, 240a, wait for a fixed interval corresponding to the commutation time. Next, a step 241 is executed in which the commutation thyristor is turned off and the positive switch is turned on to cause positive current be conducted. The polarity status is then complemented in a step 242 to indicate the new switch state. A return is then made via step 232 to the routine of FIG. 14.

If step 228 in FIG. 15 had determined that the present polarity bit was not positive a determination would be made in a step 240 as to whether the last polarity bit was also negative. If so, step 231 would be executed and a return made as after step 230, as explained above. If not, a step 243 is next executed in which the positive power switch is turned off and the commutation thyristor is turned on. A fixed time delay corresponding to the commutation interval is then loaded and executed in steps 245, 245a. After the fixed time delay has elasped, the commutation thyristor is turned off and the negative power switch (lower main) is turned on in a step 246 which cause negative current to be conducted. The polarity status is changed to reflect the new switch state in a step 247 and a return is then made in step 232 to the steps of FIG. 14.

Referring back to FIG. 14, upon return from the GATES subroutine, the switch counter is incremented in a step 250 and then checked to see if the seventh switch point is completed. If not, the sequence is repeated as indicated by a step 252. If it is completed, the second 90° sequence is begun by setting up the switch point counter again in a step 254 and reversing and complementing the PWM polarity bits in a step 256 (because the second quarterwave is the mirror image of the first). The switch point counter reset in step 254 points at the seventh switch polarity bit. The timer pointer is already pointing at the correct value since the first switch time of the second quarterwave is the same as the last switch time of the first quarterwave due to the waveform symmetry. During the period in which steps 254 and 256 are being executed the last timer from the previous quarterwave is still timing out. While waiting for the last time delay to time out, the next time delay is fetched from the stored quarterwave sequence as indicated in a step 258. Waiting continues in a step 260 until the last time delay times out at which point the GATES subroutine is recalled in a step 262. After returning from the GATES subroutine, the switch point counter and timer pointer are decremented in a step 264. A step 266 is next executed in order to determine whether the seven switch points are completed. If not the loop consisting of steps 258-266 is reexecuted repeatedly until all seven switch points are completed at which point a return is made in a step 268.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. A method for controlling the conduction states of the output stage switches of an inverter connected to a power grid for controlling the real and reactive power components of the single frequency output of the inverter to the grid according to the respective magnitudes of real and reactive power command signals, comprising the steps of:

storing a plurality of groups of sequences of transition initiating signals for initiating transitions in the conduction states of the inverter output stage switches, each sequence for effecting a selected number of inverter output current reversals, each group of stored sequences having the same number of transition initiating signals within each of its sequences which is different than the number of transition initiation signals in the sequences of each other group;

selecting in response to a reactive power command signal a stored sequence of transition initiating signals from one of said groups and providing a corresponding timed sequence of inverter output current reversals which in turn effects the commanded reactive power output component, said selected one of said groups being a group having a greater number of transition initiating signals in each of its sequences for a decreasingly leading and increasingly lagging reactive power command signal, said selected one of said groups being a group having a lesser number of transition signals in each of its sequences for an increasingly leading and decreasingly lagging reactive power command signal; and responding to leading and lagging real power command signals by respectively advancing and retarding the phase of the selected sequence to effect the commanded real power output component.

2. Apparatus for controlling the conduction states of the output stage switches of an inverter connected to a power grid to thereby control the real and reactive power components of the single frequency output of the inverter to the grid according to the respective magnitudes of real and reactive power command signals, comprising:

memory means, for storing a plurality of groups of sequences of switch conduction transition initiating signals for initiating transitions in the conduction states of the inverter output stage switches, each sequence for effecting a selected number of inverter output current reversals, each group of stored sequences having the same number of transition initiating signals in each of its sequences which is different from the number of transition initiation signals in the sequences of each other group; and central processing means, responsive to a reactive power command signal for selecting from said memory means a stored sequence of transition initiating signals from a selected one of said groups and providing a corresponding timed sequence of inverter output current reversals for in turn providing the commanded reactive power output component, said selected one of said groups being a group having a greater number of transition initiating signals in each of its sequences for a decreasingly leading and increasingly lagging reactive power command signal, said selected one of said groups being a group having a lesser number of transition signals in each of its sequences for an increasingly leading and decreasingly lagging reactive power command signal, said central processing means further responsive to a real power command signal for respectively advancing and retarding the phase of the selected sequence for providing the commanded real power output component.

* * * * *